US012511633B2

(12) United States Patent
Mattier et al.

(10) Patent No.: US 12,511,633 B2
(45) Date of Patent: Dec. 30, 2025

(54) SYSTEMS AND METHODS FOR INTEGRATING THIRD PARTY SOFTWARE COMPONENTS WITH POINT OF SALE SYSTEMS

(71) Applicant: Lillii RNB Inc., Atlanta, GA (US)

(72) Inventors: Charlotte Mattier, Vancouver, WA (US); Barbara Jones, Lithonia, GA (US)

(73) Assignee: Lillii RNB Inc., Atlanta, GA (US)

( * ) Notice: Subject to any disclaimer, the term of this patent is extended or adjusted under 35 U.S.C. 154(b) by 137 days.

(21) Appl. No.: 18/093,722

(22) Filed: Jan. 5, 2023

(65) Prior Publication Data

US 2023/0222473 A1    Jul. 13, 2023

Related U.S. Application Data

(60) Provisional application No. 63/297,568, filed on Jan. 7, 2022.

(51) Int. Cl.
*G06Q 20/20* (2012.01)
*G06F 9/54* (2006.01)
*G06Q 20/08* (2012.01)

(52) U.S. Cl.
CPC ............. *G06Q 20/20* (2013.01); *G06F 9/541* (2013.01); *G06Q 20/0855* (2013.01)

(58) Field of Classification Search
CPC .. G06Q 20/20; G06Q 20/0855; G06Q 20/202; G06F 9/541; G07G 1/0009
USPC ........................................................ 705/16
See application file for complete search history.

(56) References Cited

U.S. PATENT DOCUMENTS

| 2004/0243517 | A1  | 12/2004 | Hansen |
| 2019/0005499 | A1* | 1/2019 | Wall .................... G06Q 20/20 |
| 2020/0250644 | A1* | 8/2020 | Oberholtzer ......... G06Q 20/027 |

OTHER PUBLICATIONS

Liu, Kecheng. Security Analysis in Device-to-Device Wireless Networks. Illinois Institute of Technology ProQuest Dissertations & Theses, 2019. (Year: 2019).*

(Continued)

*Primary Examiner* — Fawaad Haider
(74) *Attorney, Agent, or Firm* — McCarter & English, LLP

(57) ABSTRACT

A system for integrating third-party software components with point of sale (POS) systems includes a memory and a processor in communication therewith. The processor deploys a POS adapter on a POS system. The POS adapter configures a framework for the POS system, interacts with transaction data generated by the POS system, generates an API request based on the first configured framework, accesses a façade gateway based on the API request, and receives one or more responses to the first API request from the façade gateway. The façade gateway translates the API request to be interpretable by the third-party software components, transmits the translated API request to the third-party software components, receives a response to the API request from the third-party software components, translates the response to be interpretable by the POS adapter, and transmits the translated response to the POS adapter such that it is executable by the POS system.

18 Claims, 6 Drawing Sheets

(56) References Cited

OTHER PUBLICATIONS

Duggan, Dominic. Enterprise Software Architecture and Design: Entities, Services, and Resources. Wiley-IEEE Computer Society PR 2012. 2012. (Year: 2012).*

PCT International Search Report and Written Opinion mailed on Apr. 13, 2023, in connection with Int'l Application No. PCT/US2023/010223 (8 pages).

* cited by examiner

SYSTEMS AND METHODS FOR INTEGRATING THIRD PARTY SOFTWARE COMPONENTS WITH POINT OF SALE SYSTEMS

RELATED APPLICATIONS

The present application claims the benefit of priority to U.S. Provisional Patent Application No. 63/297,568, filed on Jan. 7, 2022, the entire disclosure of which is expressly incorporated by reference herein in its entirety.

TECHNICAL FIELD

The present disclosure relates generally to point of sale systems. More particularly, the present disclosure relates to systems and methods for integrating third party software components with point of sale systems.

RELATED ART

The process of integrating third party software components (e.g., a hardware driver or application programming interface (API)) into the software of respective point of sale (POS) systems can require significant time and resources, and can be generally inefficient. In particular, for POS integrators (entities that integrate software into POS systems), the work required for integration is compounded each time development work for a different or new POS system or integration is undertaken, largely due to the fact that repeat integrations across various POS systems cannot be easily performed. For example, a known approach for POS integrations requires executing each integration in silo (in a standalone configuration) for each individual project such that custom software development work (e.g., code) is required for each specific POS system, integration, and client software code. This approach requires significant time before the final custom software code can be deployed to a POS system and precludes the re-use of the code among a set of integrations (e.g., repeat integrations across various POS systems). Further, developing and deploying custom software code requires regular maintenance to ensure the continued functionality of the POS system as each of the POS software and integration software are separately updated.

As such, what is needed is a reduction in the current complexities of integrating third party software components into POS systems. For example, it would be desirable to eliminate the need for custom software development code with each integration deployment and allow for the re-use of pre-existing code. It would also be desirable for the pre-existing code to provide for any POS system to communicate with any third party system or software during the integration process. Thus, in view of the existing technology in this field, what is desired is a system and method that automatically, seamlessly, and efficiently provides for integration of third party software components with various POS systems without requiring code rewriting and maintenance. Accordingly, the systems and methods disclosed herein solve these and other needs.

SUMMARY

The present disclosure relates to systems and methods for integrating third party software components with POS systems. In particular, the system bridges a gap between a third party service and a client as an automated and efficient solution for integrating the third party software component into a client POS system using a façade gateway and a POS adapter. The system deploys a POS adapter to a client POS system and configures a framework for the client POS system based on at least one of a selected integration (e.g., a third party service) and the deployed POS adapter. The POS adapter interacts with transaction data generated by the client POS system and generates an API call (e.g., a request) to the framework based on the framework configuration. The POS adapter accesses the façade gateway based on the API call and the façade gateway processes the incoming request by translating the request, and subsequently transmits the translated request to a third party API based on the framework configuration. The third party API processes the request and transmits response data to the façade gateway. The façade gateway processes the response data by translating the response data and transmits the translated response data to the POS adapter and, in response, the POS adapter continues the execution of a POS process flow.

An integration system can include a façade gateway and a POS adapter. The façade gateway can be a microservice layer that can serve as a "wrapper" gateway for third party services and APIs, and leverage a façade pattern to expose subsets of similar services through a common interface. That is, the façade gateway can receive and process an API call (e.g., an incoming request). The façade gateway could also extract or receive transaction data from each client POS system request and process the data by translating the data such that each unique third party service can receive and process the data. The POS adapter can be a uniform application extension for a client POS system and can be deployed to a client POS system via a coding engine as a code package or module (e.g., a .jar file, a .patch, etc.). The coding engine can update the client POS system with the common interface information needed to communicate with the façade gateway. The POS adapter can provide a mechanism to control which third party services communicate with the façade gateway via the respective APIs of the third party services.

According to one aspect of the present disclosure, an integration system for integrating one or more third party software components with one or more POS systems is provided. The system includes a memory and a processor in communication with the memory. The processor deploys a first POS adapter on a first POS system of the one or more POS systems. The first POS adapter configures a first framework for the first POS system based at least in part on at least one of the first deployed POS adapter and the one or more third party software components. The first POS adapter interacts with transaction data generated by the first POS system and generates a first API request based at least in part on the first configured framework. The first POS adapter accesses a façade gateway based at least in part on the first API request and receives one or more responses to the first API request from the façade gateway. The façade gateway translates the first API request such that the first API request is interpretable by the one or more third party software components, and transmits the translated first API request to the one or more third party software components. The façade gateway receives one or more responses to the first API request from the one or more third party software components, translates the one or more responses to the first API request such that the one or more responses to the first API request are interpretable by the first deployed POS adapter, and transmits the one or more translated responses to the first API request to the first deployed POS adapter such that the one or more translated responses to the first API request are executable by the first POS system.

According to another aspect of the present disclosure, a method for integrating one or more third party software components with one or more POS systems is provided. The method involves deploying a first POS adapter on a first POS system of the one or more POS systems and configuring a first framework for the first POS system based at least in part on the first deployed POS adapter and the one or more third party software components. The method further involves interacting with transaction data generated by the first POS system and generating a first API request based at least in part on the first configured framework. The method additionally involves translating the first API request such that the first API request is interpretable by the one or more third party software components and transmitting the translated first API request to the one or more third party software components. The method also involves receiving one or more responses to the first API request from the one or more third-party software components, translating the one or more responses to the first API request such that one or more responses to the first API request are interpretable by the first deployed POS adapter, and transmitting the one or more translated responses to the first API request to the first deployed POS adapter such that the one or more translated responses to the first API request are executable by the first POS system.

According to another aspect of the present disclosure, a non-transitory computer readable medium having instructions stored thereon for integrating one or more third party software components with one or more POS systems which, when executed by a processor, causes the processor to carry out steps is provided. In this regard, the steps include configuring a first framework for a first POS system based at least in part on a first POS adapter deployed on the first POS system and the one or more third party software components. The steps further involve interacting with transaction data generated by the first POS system and generating a first API request based at least in part on the first configured framework. The steps additionally involve translating the first API request such that the first API request is interpretable by the one or more third party software components and transmitting the translated first API request to the one or more third party software components. The steps also involve receiving one or more responses to the first API request from the one or more third-party software components, translating the one or more responses to the first API request such that one or more responses to the first API request are interpretable by the first deployed POS adapter, and transmitting the one or more translated responses to the first API request to the first deployed POS adapter such that the one or more translated responses to the first API request are executable by the first POS system.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for integrating third party software components with point of sale systems, as described in detail below in connection with FIGS. 1-6.

Figure 1:
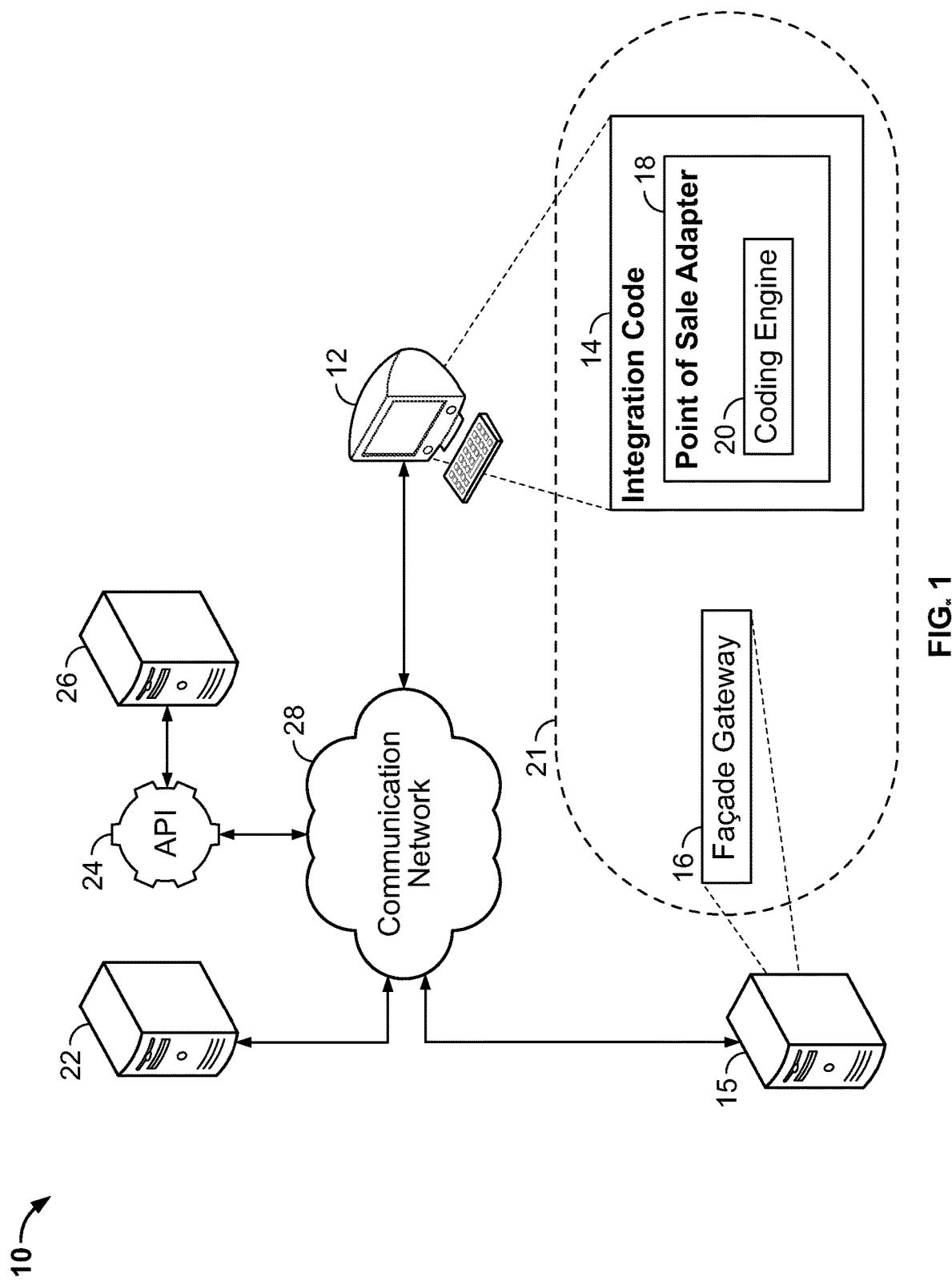
FIG. 1 is a diagram illustrating an embodiment of the system of the present disclosure.

FIG. 1 is a diagram illustrating an embodiment of the system 10 of the present disclosure. The system 10 can include a central processing unit 12 (e.g. a hardware processor) of a computer system (e.g., a client POS system), a computation server 15, a database server 22 and an API 24 coupled to a third party server 26 (e.g., a third party application or service). The hardware processor 12, the computation server 15, the database server 22, and the API 24 coupled to the third party server 26 can communicate via a communication network 28. The hardware processor 12 could include, but is not limited to, a personal computer, a laptop computer, a tablet computer, a smart telephone, a server, an embedded computer system (e.g., a processor of a POS system), a microprocessor, and/or a cloud-based computing platform.

The system 10 also includes an integration system 21 including integration code 14 (e.g., non-transitory, computer-readable instructions) stored on a computer-readable medium and executable by the hardware processor 12 or one or more computer systems and a façade gateway 16 stored on the computation server 15. The processor 12 executes the integration code 14 which communicates with the façade gateway 16 to integrate a third party service with a client POS system. In particular, the integration code 14 could include various custom-written software modules that carry out the steps/processes discussed herein including, but not limited to, a POS adapter 18 having a coding engine 20. The integration code 14 could be programmed using any suitable programming languages including, but not limited to, C, C++, C #, Java, Python or any other suitable language. Additionally, the integration code 14 could be distributed across multiple computer systems in communication with each other over a communication network, stored within a kiosk or other hardware, and/or stored and executed on a cloud computing platform and remotely accessed by a computer system in communication with the cloud computing platform. The integration code 14 could also be installed in a POS system by an installer, user, or technician. As discussed in greater detail in connection with FIGS. 3 and 4, the integration code 14 could communicate with the computation server 15 via the façade gateway 16, the database 22, and the third party server 26 via the API 24, which could be stored on the same computer system as the integration code 14, or on one or more other computer systems in communication with the integration code 14.

Still further, elements of the system 10 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations.

The integration system 21 bridges a gap between a third party service and a client as an automated and efficient solution for integrating the third party service into a client POS system via the façade gateway 16 and the POS adapter 18. The façade gateway 16 can be a microservice layer that serves as a wrapper gateway for third party services and APIs, and leverages a façade pattern to expose subsets of similar services through a common interface. That is, the façade gateway 16 can receive and processes an API call (e.g., an incoming request) from the POS system. The façade gateway 16 also extracts or receives transaction data from each client POS system request and processes the data by translating the data such that each unique third party service can receive and process the data. This provides for a POS system common interface such that a client can subscribe to a plurality of unique third party services and switch between competing services without executing custom software code changes to the POS system thereof for each unique third party service.

The POS adapter 18 is a uniform application extension for a client POS system and can be deployed to a client POS system via the coding engine 20 as a code package or module (e.g., a .jar file, a .patch, etc.). The coding engine 20 updates the client POS system with the common interface information needed to communicate with the façade gateway 16. Alternatively, the POS adapter 18 can be placed within a file system of a client POS system via an integrator (not shown) such that, with basic configuration, the integrator can execute integrations without additional code. The POS adapter 18 provides a mechanism to control which third party services communicate with the façade gateway 16 via the respective APIs 24 of the third party services. The POS adapter 18 is compiled utilizing languages supported by a client POS system and, as such, it should be understood that the POS adapter 18 can differ between varying client POS systems.

Alternatively, it should be understood that the façade gateway 16 could be provided on the same system as the hardware processor 12, e.g., on the POS system.

Figure 2:
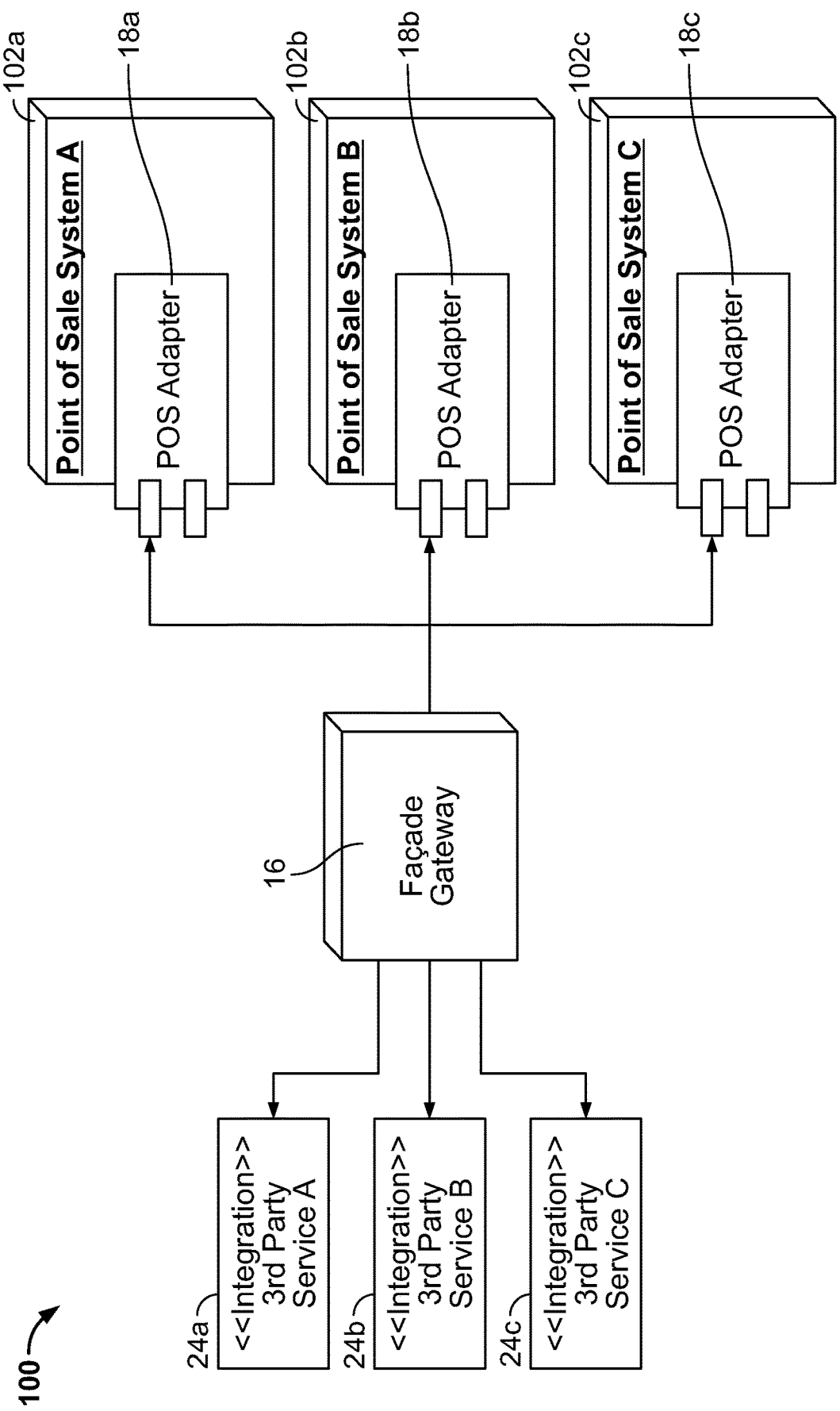
FIG. 2 is a diagram illustrating an integration of the system of the present disclosure within various point of sale systems and interactions thereof.

FIG. 2 is a diagram 100 illustrating an integration of the system of the present disclosure within various point of sale systems 102*a-c* and interactions thereof. As shown in FIG. 2, POS adapters 18*a-c* can be deployed to respective client POS systems 102*a-c* to facilitate communication with third party services 24*a-c* via the façade gateway 16. As such, the integration system 21 (including the façade gateway 16) bridges a gap between a third party service and a client as an automated and efficient solution for integrating the third party service into a client POS system via the façade gateway 16 and the POS adapter 18. In this way, the integration system 21 provides for a POS system common interface such that a client can subscribe to a plurality of unique third party services and switch between competing services without executing custom software code changes to the POS system thereof for each unique third party service.

Figure 3:
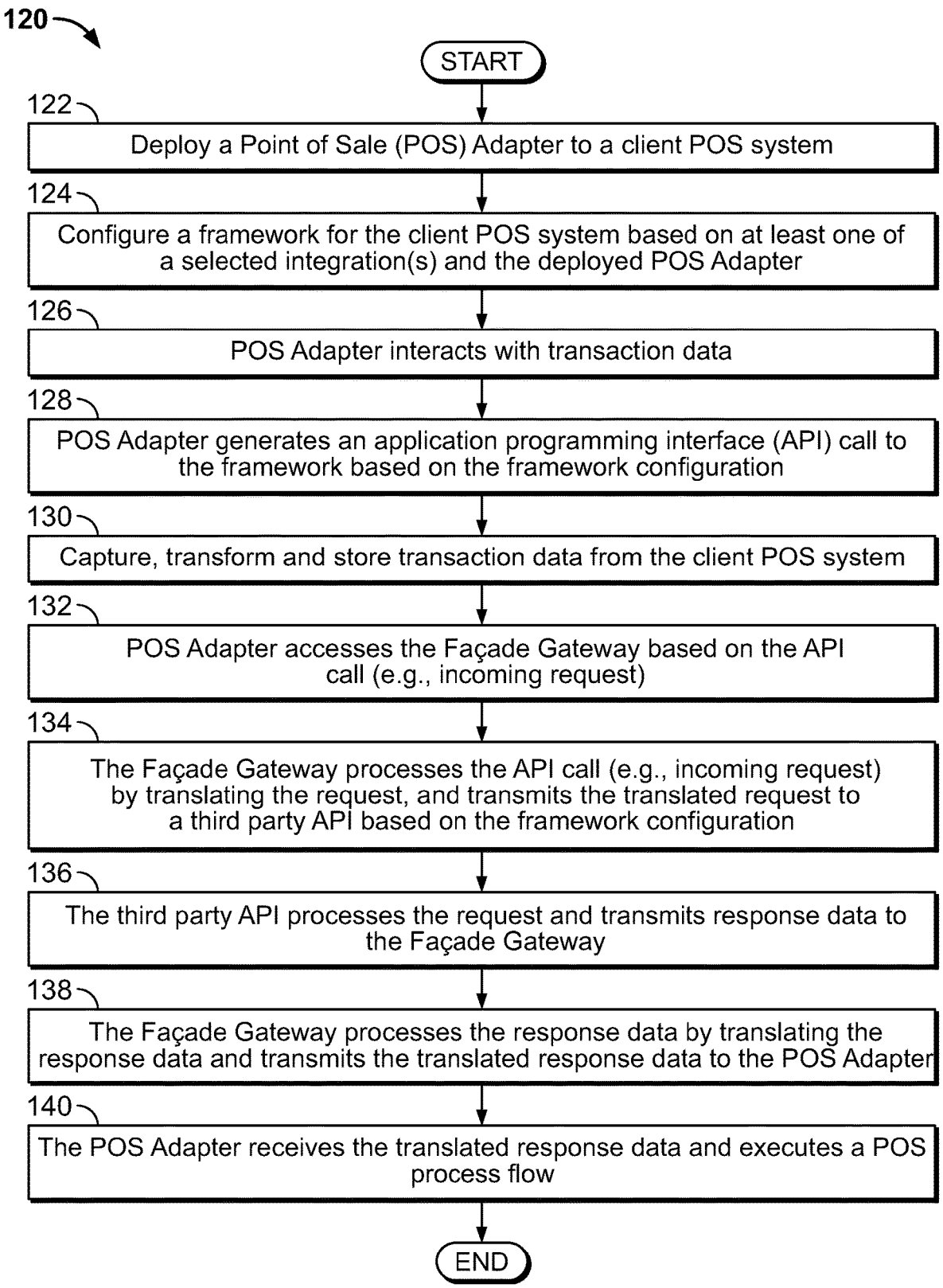
FIG. 3 is a flowchart illustrating overall process steps carried out by the system of the present disclosure.

FIG. 3 is a flowchart illustrating overall process steps 120 carried out by the system of the present disclosure. Beginning in step 122, the integration system 21 deploys a POS adapter 18 to a client POS system. Then, in step 124, the integration system 21 configures a framework for the client POS system based on at least one of a selected integration (e.g., third party services selected by the POS system operator for integration) and the deployed POS adapter 18. It should be understood that the framework can be an application or function. For example, the framework could be configured to detect and analyze one or more attributes (e.g., inventory, margin, payment type, reward, geolocation, etc.) of transaction data (e.g., a sale or return) generated by a client POS system. In step 126, the POS adapter 18 interacts with transaction data generated by the client POS system. In step 128, the POS adapter 18 generates an API call (e.g., a request) to the framework based on the framework configuration. Then, in step 130, the integration system 21 captures, transforms, and stores the transaction data generated by the client POS system. Step 130 is discussed in greater detail in connection with FIG. 4. In step 132, the POS adapter 18 accesses the façade gateway 16 based on the API call. As previously noted, it should be understood that the façade gateway 16 can be a microservice layer which receives and processes an API call (e.g., an incoming request). Next, in step 134, the façade gateway 16 processes the API call (e.g., incoming request) by translating the request, and transmits the translated request to a third party API 24 based on the framework configuration. In particular, the façade gateway 16 translates transaction data components that are common to various point of sale systems (e.g., a line item, price, tax, etc.) into a standard format, and, once these components are in the standard format, the façade gateway 16 dynamically builds data structures per requirements of the third party API 24. It should be understood that different third party APIs 24 can require slight variations in data structure as generally defined in a third party API 24 contract. In step 136, the third party API 24 processes the request and transmits response data to the façade gateway 16. Then, in step 138, the façade gateway 16 processes the response data by translating the response data, and transmits the translated response data to the POS adapter 18. In particular, the façade gateway 16 translates common response data components into a standard format interpretable by the POS adapter 18. Lastly, in step 140, the POS adapter 18 receives the translated response data and, in response, continues the execution of the POS process flow that spurred the communication between the POS system and the third party service.

Figure 4:
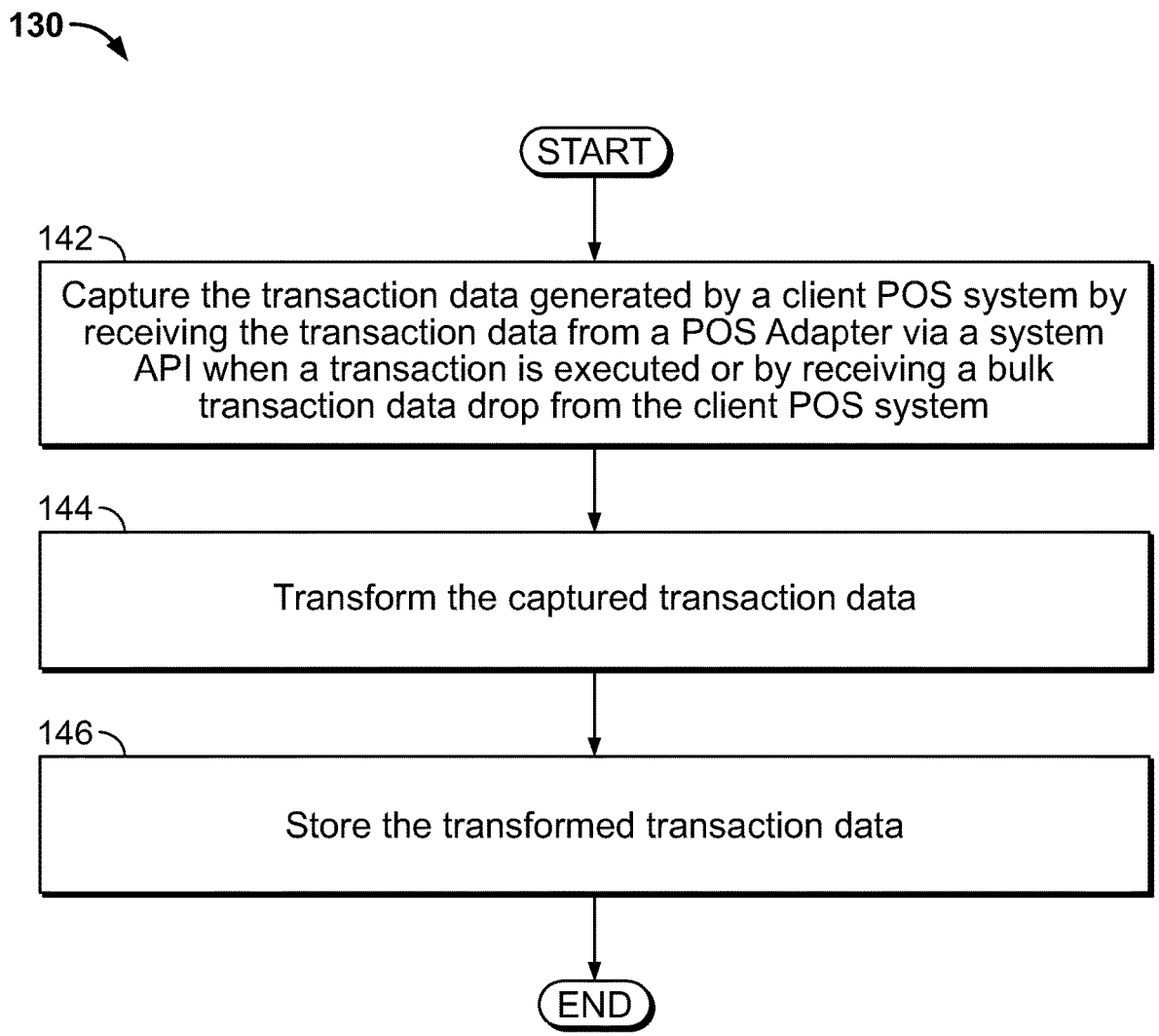
FIG. 4 is a flowchart illustrating step 130 of FIG. 4 in greater detail.

FIG. 4 is a flowchart illustrating step 130 of FIG. 4 in greater detail. In particular, FIG. 4 illustrates process steps for capturing, transforming, and storing transaction data from a client POS system. Beginning in step 142, the integration system 21 captures transaction data generated by a client POS system by receiving the transaction data from a POS adapter 18 via an API of the integration system 21 when a transaction (e.g., a sale or return) is executed at the client POS system or by receiving a bulk transaction data drop directly from the client POS system. In step 144, the integration system 21 transforms the captured transaction data into a standard format. Transforming the captured transaction data into a standard format facilitates processing of the transaction data such that the transformed transaction data can be processed in the same manner irrespective of which client POS system the transaction data is received from. Then, in step 146, the integration system 21 stores the transformed transaction data in a database 22. It should be understood that the integration system 21 can process the stored and transformed transaction data via several different processing techniques (e.g., pattern matching, historical analysis, machine learning algorithms, etc.) to identify fraud, organized crime, and regional and industry trends.

Figure 5:
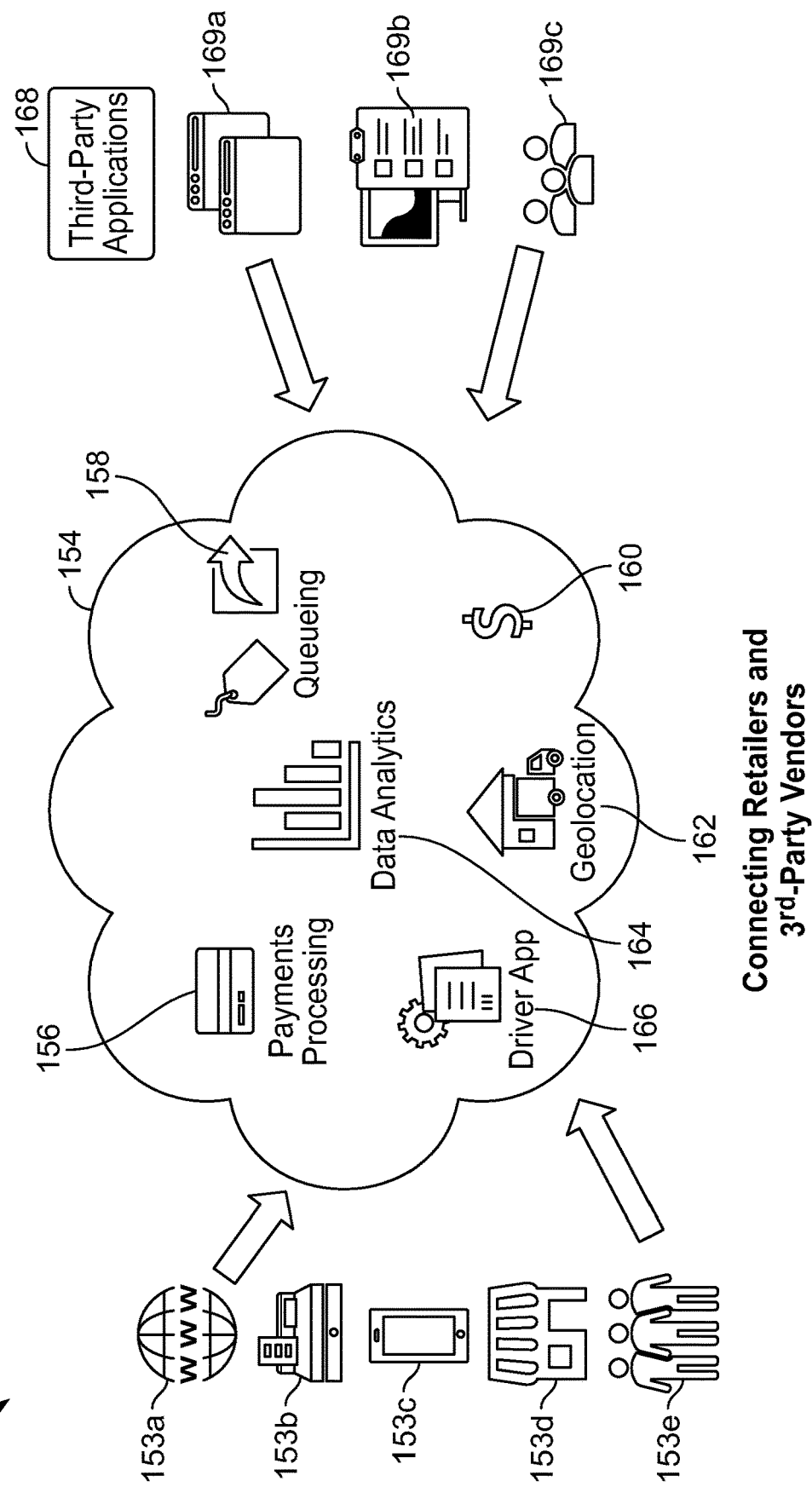
FIG. 5 is a diagram illustrating an example application of the system of the present disclosure.

FIG. 5 is a diagram 150 illustrating an example application of the system of the present disclosure. As shown in FIG. 5, the integration system 21 provides for system integration as a service via a communication network 154 such that third party applications 168 (e.g., third party vendors 169*a-c*) can automatically and seamlessly integrate with various POS systems 153*a-e* of respective retailers. In particular, FIG. 5 illustrates that the third party vendors 169a-c can integrate with the POS systems 153a-e to detect and analyze attributes (e.g., payment type 156, queueing 158, a cash back or loyalty reward 160, geolocation 162, data analytics 164 (e.g., fraud, inventory, etc.), and a hardware driver application 166 associated with a hardware integration (e.g., a scanner, receipt printer, etc.) of a POS system) of various types of in-house returns (including outsourced returns) generated by the POS systems 153a-e of the respective retailers.

Figure 6:
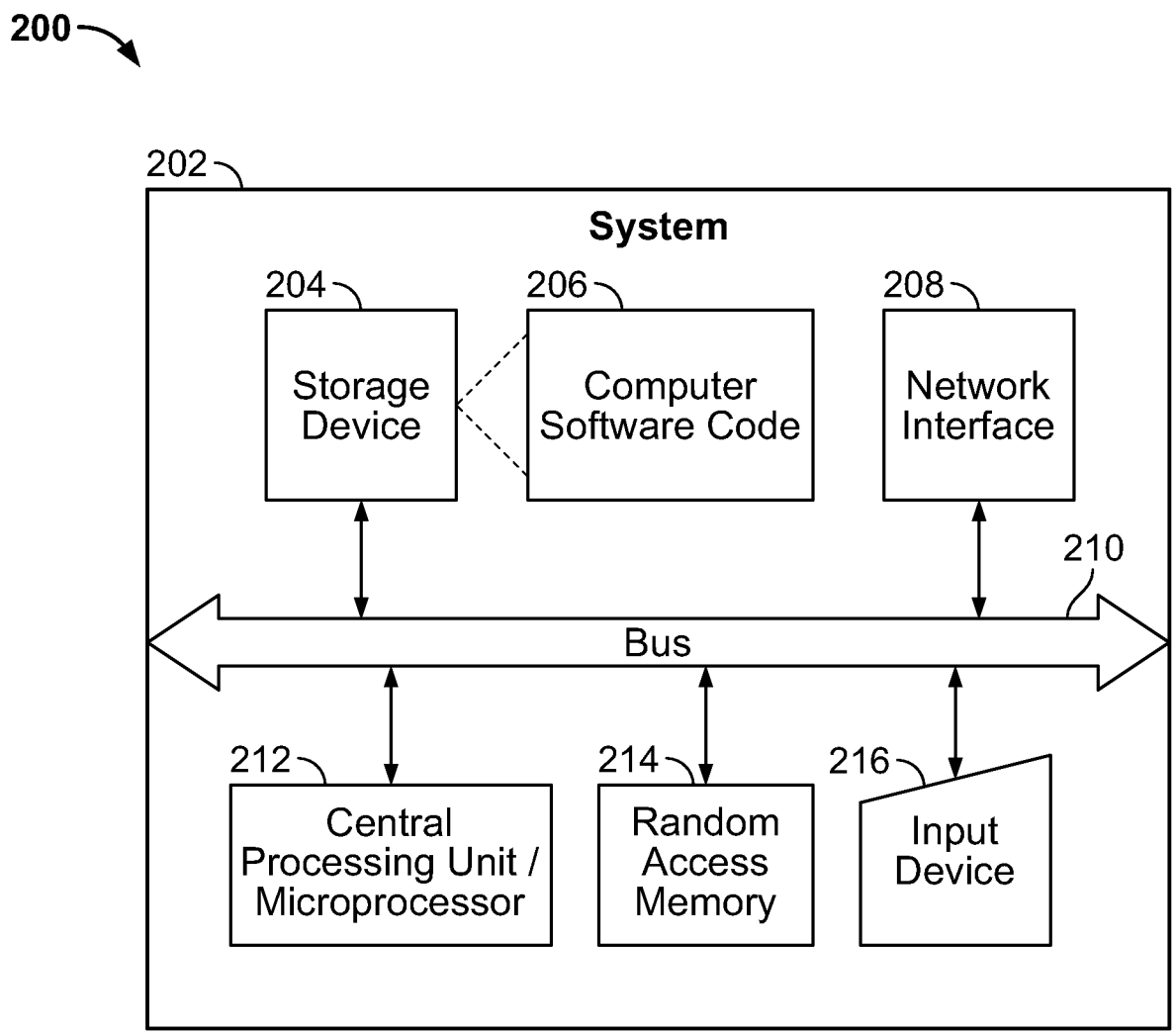
FIG. 6 is a diagram illustrating hardware and software components capable of being utilized to implement the system of the present disclosure.

FIG. 6 is a diagram 200 illustrating hardware and software components of a computer system 202 on which the integration code 14 of the present disclosure can be implemented. The computer system 202 can include a storage device 204, computer software code 206 (e.g., integration code 14), a network interface 208, a communications bus 210, a central processing unit (CPU) or microprocessor 212, a random access memory (RAM) 214, and one or more input devices 216, such as a keyboard, mouse, etc. It is noted that the CPU 212 could also be one or more graphics processing units (GPUs). The computer system 202 could also include a display (e.g., a liquid crystal display (LCD), a cathode ray tube (CRT), etc.). The storage device 204 could comprise any suitable, computer-readable storage medium such as a disk, non-volatile memory (e.g., read-only memory (ROM), erasable programmable ROM (EPROM), electrically-erasable programmable ROM (EEPROM), flash memory, FPGA, etc.). The computer system 202 could be a networked computer system, a personal computer, a server, a smart phone, a tablet computer, etc. It is noted that the server need not be a networked server, and indeed, could be a stand-alone computer system.

The functionality provided by the present disclosure could be provided by computer software code 206, which could be embodied as computer-readable program code stored on the storage device 204 and executed by the CPU 212 using any suitable, high or low level computing language and/or executable files, such as Python, Java, C, C++, C #, .NET, .Jar File, .Patch, etc. The network interface 208 could include an Ethernet network interface device, a wireless network interface device, or any other suitable device which permits the computer system 202 to communicate via a network. The CPU 212 could include any suitable single-core or multiple-core microprocessor of any suitable architecture that is capable of implementing and running the computer software code 206. The RAM 214 could be any suitable, high-speed, RAM typical of most modern computers, such as dynamic RAM (DRAM).

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. An integration system for integrating one or more third party software components with one or more point of sale (POS) systems, comprising:
   a memory;
   a processor in communication with the memory, the processor:
      deploying a first POS adapter on a first POS system of the one or more POS systems;
      the first POS adapter:
         configuring a first framework for the first POS system based at least in part on at least one of the first deployed POS adapter or the one or more third party software components;
         interacting with transaction data generated by the first POS system;
         generating a first application programming interface (API) request based at least in part on the first configured framework;
         accessing a façade gateway based at least in part on the first API request; and
         receiving one or more responses to the first API request from the façade gateway; and
      the façade gateway:
         translating the first API request such that the first API request is interpretable by the one or more third party software components, the façade gateway translating the first API request by:
            translating transaction data components that are common to the one or more POS systems into a standard format, and
            dynamically building one or more data structures based at least in part on requirements of the one or more third party software components, each data structure being associated with a respective third party software component;
         transmitting the translated first API request to the one or more third party software components;
         receiving one or more responses to the first API request from the one or more third party software components;
         translating the one or more responses to the first API request such that the one or more responses to the first API request are interpretable by the first deployed POS adapter; and
         transmitting the one or more translated responses to the first API request to the first deployed POS adapter such that the one or more translated responses to the first API request are executable by the first POS system.

2. The integration system of claim 1, wherein the processor:
   deploys a second POS adapter to a second POS system of the one or more POS systems;
   wherein the second POS adapter:
   configures a second framework for the second POS system based at least in part on at least one of the second deployed POS adapter or the one or more third party software components;
   interacts with transaction data generated by the second POS system;
   generates a second API request based at least in part on the second configured framework;
   accesses the façade gateway based at least in part on the second API request; and
   receives one or more response to the second API request from the façade gateway;
   wherein the façade gateway:
   translates the second API request such that the second API request is interpretable by the one or more third party software components;
   transmits the translated second API request to the one or more third party software components;
   receives one or more responses to the second API request from the one or more third party software components;

translates the one or more responses to the second API request such that the one or more responses to the second API request are interpretable by the second deployed POS adapter; and transmits the one or more translated responses to the second API request to the second deployed POS adapter such that the one or more translated responses to the second API request are executable by the second POS system.

3. The integration system of claim 1, wherein the processor:

captures the transaction data generated by the first POS system;

transforms the captured transaction data into a standard format such that the transformed transaction data can be processed in the same manner irrespective of which POS system transaction data is received from; and stores the transformed transaction data in a database.

4. The integration system of claim 3, wherein the processor captures the transaction data by, at least one of:

receiving the transaction data from the first deployed POA POS adapter when a transaction is executed at the first POS system; or receiving a bulk transaction data drop directly from the first POS system.

5. The integration system of claim 1, wherein the façade gateway translates the one or more responses to the first API request by:

translating common response data components of the one or more responses into a standard format interpretable by the first POS adapter.

6. The integration system of claim 1, wherein the framework is configured to detect and analyze one or more attributes of the first transaction data.

7. The integration system of claim 6, wherein the one or more attributes comprise a payment type, queueing, a cash back reward, a loyalty reward, a geolocation, data analytics, inventory, and margin.

8. The integration system of claim 1, wherein the first POS adapter comprises a uniform application extension for the first POS system.

9. The integration system of claim 1, wherein the façade gateway comprises a microservice layer that leverages a façade pattern to expose subsets of similar services through a common interface.

10. A method for integrating one or more third party software components with one or more POS systems, comprising:

deploying a first POS adapter on a first POS system of the one or more POS systems;

configuring a first framework for the first POS system based at least in part on at least one of the first deployed POS adapter or the one or more third party software components;

interacting with transaction data generated by the first POS system;

generating a first API request based at least in part on the first configured framework;

accessing a façade gateway based at least in part on the first API request;

receiving one or more responses to the first API request from the façade gateway;

translating the first API request with the façade gateway such that the first API request is interpretable by the one or more third party software components, the façade gateway translating the first API request by:

translating transaction data components that are common to the one or more POS systems into a standard format, and dynamically building one or more data structures based at least in part on requirements of the one or more third party software components, each data structure being associated with each a respective third party software component;

transmitting the translated first API request to the one or more third party software components;

receiving one or more responses to the first API request from the one or more third-party software components;

translating the one or more responses to the first API request such that the one or more responses to the first API request are interpretable by the first deployed POS adapter; and transmitting the one or more translated responses to the first API request to the first deployed POS adapter such that the one or more translated responses to the first API request are executable by the first POS system.

11. The method of claim 10, further comprising:

deploying a second POS adapter on a second POS system of the one or more POS systems;

configuring a second framework for the second POS system based at least in part on at least one of the second deployed POS adapter or the one or more third party software components;

interacting with transaction data generated by the second POS system;

generating a second API request based at least in part on the second configured framework;

translating the second API request such that the second API request is interpretable by the one or more third party software components;

transmitting the translated second API request to the one or more third party software components;

receiving one or more responses to the second API request from the one or more third-party software components;

translating the one or more responses to the second API request such that the one or more responses to the second API request are interpretable by the second deployed POS adapter; and transmitting the one or more translated responses to the second API request to the second deployed POS adapter such that the one or more translated responses to the second API request are executable by the second POS system.

12. The method of claim 10, further comprising:

capturing the transaction data generated by the first POS system;

transforming the captured transaction data into a standard format such that the transformed transaction data can be processed in the same manner irrespective of which POS system transaction data is received from; and storing the transformed transaction data in a database.

13. The method of claim 12, wherein capturing the first transaction data comprises at least one of:

receiving the transaction data from the first deployed POA POS adapter when a transaction is executed at the first POS system; or receiving a bulk transaction data drop directly from the first POS system.

14. The method of claim 10, wherein translating the one or more responses to the first API request comprises:

translating common response data components of the one or more responses into a standard format interpretable by the first POS adapter.

15. The method of claim 10, wherein the framework is configured to detect and analyze one or more attributes of the first transaction data.

16. The method of claim 15, wherein the one or more attributes comprise a payment type, queueing, a cash back reward, a loyalty reward, a geolocation, data analytics, inventory, and margin.

17. The method of claim 10, wherein the first POS adapter comprises a uniform application extension for the first POS system.

18. A non-transitory computer readable medium having instructions stored thereon for integrating one or more third party software components with one or more POS systems which, when executed by a processor, causes the processor to carry out the steps of:
configuring a first framework for a first POS system based at least in part on at least one of a first POS adapter deployed on the first POS system or the one or more third party software components;
interacting with transaction data generated by the first POS system;
generating a first API request based at least in part on the first configured framework;
accessing a façade gateway based at least in part on the first API request; and
receiving one or more responses to the first API request from the façade gateway;
wherein the façade gateway:
translates the first API request such that the first API request is interpretable by the one or more third party software components, the façade gateway translating the first API request by:
translating transaction data components that are common to the one or more POS systems into a standard format, and
dynamically building one or more data structures based at least in part on requirements of the one or more third party software components, each data structure being associated with each a respective third party software component;
transmits the first translated API request to the one or more third party software components;
receives one or more responses to the first API request from the one or more third-party software components;
translates the one or more responses to the first API request such that one or more responses to the first API request are interpretable by the first deployed POS adapter; and
transmits the one or more translated responses to the first API request to the first deployed POS adapter such that the one or more translated responses to the first API request are executable by the first POS system.

* * * * *